(12) United States Patent
Bourque et al.

(10) Patent No.: US 11,893,437 B2
(45) Date of Patent: Feb. 6, 2024

(54) RFID VIAL TRACKING WITH RFID INLAY

(71) Applicant: Avery Dennison Retail Information Services LLC, Mentor, OH (US)

(72) Inventors: Douglas Bourque, Rowlett, TX (US); Brad Cumby, Liberty Township, OH (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 16/041,960

(22) Filed: Jul. 23, 2018

(65) Prior Publication Data

US 2019/0026616 A1    Jan. 24, 2019

Related U.S. Application Data

(60) Provisional application No. 62/535,387, filed on Jul. 21, 2017.

(51) Int. Cl.
*G06K 19/077* (2006.01)
*G06K 19/07* (2006.01)
(Continued)

(52) U.S. Cl.
CPC ....... *G06K 19/0723* (2013.01); *B65D 23/085* (2013.01); *G06K 7/10346* (2013.01);
(Continued)

(58) Field of Classification Search
CPC ......... G06K 19/0723; G06K 19/07749; G06K 19/07758; G06K 19/0776; G06K 7/10346; G06K 19/025; G06K 19/027; G06K 19/041; G06K 19/06037; G06K 19/07; G06K 19/0772; G06K 19/07771; G06K 19/07773; G06K 19/07775; G06K 19/08;
(Continued)

(56) References Cited

U.S. PATENT DOCUMENTS

2004/0070504 A1* 4/2004 Brollier .............. G08B 13/2417
340/572.8
2004/0173508 A1 9/2004 Deursen et al.
(Continued)

FOREIGN PATENT DOCUMENTS

| CN | 204117184 U | 1/2015 |
|---|---|---|
| WO | 2006029105 | 3/2006 |
| WO | 2016094606 | 6/2016 |

OTHER PUBLICATIONS

International Search Report and Written Opinion dated Oct. 24, 2018 for International Application No. PCT/US2018/043237.
(Continued)

*Primary Examiner* — Dionne Pendleton

(57) ABSTRACT

A RFID label for use on a lid of a container, and a method of using the RFID label. The RFID label comprises a substrate component, a RFID antenna formed on the substrate component, and a RFID chip for storing data coupled to the RFID antenna. The RFID label is positioned or configured on the lid so as to limit or avoid any interference between the RFID antenna and the RFID chip by any metal component of the container. The RFID label is particularly useful for containers that have small lids or metal components, such as vials, where conventional RFID usage is limited.

18 Claims, 3 Drawing Sheets

(51) Int. Cl.
    *B65D 23/08*      (2006.01)
    *G08B 13/24*      (2006.01)
    *G06K 7/10*      (2006.01)
    *H01Q 1/22*      (2006.01)

(52) U.S. Cl.
    CPC ... *G06K 19/0776* (2013.01); *G06K 19/07749* (2013.01); *G06K 19/07758* (2013.01); *G08B 13/2445* (2013.01); *H01Q 1/2225* (2013.01)

(58) Field of Classification Search
    CPC .. G06K 19/07798; H01Q 1/2225; H01Q 1/38; H01Q 9/04; B01L 2300/022; B01L 2300/0832; B01L 2300/0851; B01L 3/00; B01L 3/5082; B01L 3/545; B01L 3/5453; D05B 23/00; Y10T 29/4902; H04W 4/80; B60R 2325/103; B60R 25/245; B65D 2203/10; B65D 51/245; B65D 41/34; B65D 51/18; B65D 41/62; B65D 2401/15; B65D 2401/05; B65D 55/02; B65D 55/028; B65D 23/085; A61J 2205/60; G01V 15/00; G08B 13/2417; G08B 13/2431; G08B 13/2445; B65C 2009/0003; B65C 3/24
    See application file for complete search history.

(56) References Cited

U.S. PATENT DOCUMENTS

| | | | |
|---|---|---|---|
| 2005/0051624 A1* | 3/2005 | Kipp | B65D 55/02 |
| | | | 235/385 |
| 2005/0284358 A1 | 12/2005 | Laackmann | |
| 2006/0038683 A1* | 2/2006 | Claessens | G08B 13/2445 |
| | | | 340/572.1 |
| 2006/0180650 A1* | 8/2006 | Claessens | G06K 19/07749 |
| | | | 235/383 |
| 2007/0075141 A1 | 4/2007 | Veitch et al. | |
| 2007/0182564 A1 | 8/2007 | Abbott | |
| 2007/0210173 A1 | 9/2007 | Nagel | |
| 2008/0018886 A1 | 1/2008 | Wisnudel et al. | |
| 2008/0061153 A1 | 3/2008 | Hickle et al. | |
| 2008/0094224 A1 | 4/2008 | Parker et al. | |
| 2009/0267729 A1 | 10/2009 | Rowe et al. | |
| 2009/0293815 A1 | 12/2009 | Coiro, Sr. et al. | |
| 2010/0032437 A1* | 2/2010 | Lossau | B01L 3/545 |
| | | | 235/492 |
| 2010/0141384 A1 | 6/2010 | Chen et al. | |
| 2011/0187510 A1 | 8/2011 | Forster | |
| 2012/0118975 A1 | 5/2012 | Forster | |
| 2012/0206242 A1 | 8/2012 | Cho | |
| 2013/0263958 A1* | 10/2013 | Vinoy | F16L 55/00 |
| | | | 156/60 |
| 2013/0284905 A1 | 10/2013 | Forster | |
| 2015/0090625 A1* | 4/2015 | Bauss | B65D 23/085 |
| | | | 206/459.5 |
| 2015/0339566 A1* | 11/2015 | Forster | G06K 19/07749 |
| | | | 235/492 |
| 2015/0356398 A1* | 12/2015 | Morris | G06K 19/08 |
| | | | 29/601 |
| 2016/0026911 A1 | 1/2016 | Morris et al. | |
| 2016/0244227 A1* | 8/2016 | Kurosawa | B65D 55/028 |
| 2016/0364640 A1 | 12/2016 | Dachniwskyj et al. | |
| 2017/0183135 A1* | 6/2017 | Pic | G06K 19/0739 |
| 2018/0123220 A1* | 5/2018 | Forster | H01Q 1/2225 |
| 2019/0135501 A1* | 5/2019 | Chandra | G06K 19/07798 |
| 2020/0125915 A1* | 4/2020 | Forster | G06K 19/07786 |
| 2023/0126968 A1* | 4/2023 | Giovannini | B65D 51/18 |
| | | | 340/572.8 |

OTHER PUBLICATIONS

International Preliminary Report on Patentability dated Jan. 21, 2020 issued in corresponding IA No. PCT/US2018/043237.

* cited by examiner

RFID VIAL TRACKING WITH RFID INLAY

CROSS-REFERENCE TO RELATED APPLICATION(S)

The present application claims priority from U.S. Provisional Application No. 62/535,387 filed Jul. 21, 2017 which is incorporated herein by reference in its entirety.

BACKGROUND

The present invention relates generally to a device for tracking containers using radio-frequency identification (RFID). More particularly, the present subject matter relates to a RFID label for tracking small containers, such as vials, without blocking other container identifying markings.

Devices that incorporate RFID technology are widely used for a variety of applications, such as but not limited to, inventory control, tracking, monitoring of expiration dates, quality control, and the like. These RFID devices can store and transmit useful data using unique identification codes. A RFID enabled tag or label is typically attached to an item or container, with information about the product or contents stored on the tag or label. The stored information is retrievable with a RFID reader which interrogates the RFID device electromagnetically.

Vials are small generally cylindrical containers used to contain medications in liquid or powder form that can be reconstituted with a liquid. The containers are commonly constructed from glass or plastic with a penetrable plug or stopper held in place with a metallic cap. A plastic lid covers the stopper and metallic cap and may be secured to the vial by crimping or a metal rivet. One current method of RFID enabling vials is through the use of a flag type label with a clear extended tab that wraps around the vial. One problem with this approach is that the RFID inlay or portions of the inlay can easily cover or obscure information related to the contents of the vial that are printed on, etched on, or otherwise attached to the vial. Another problem is that these flag type RFID labels wrap around the vial body causing either reduced or no-reads of the RFID labeled product due to the position or angle of the RFID inlay on the vial in relation to the reader.

RFID enabling the top of the vial with an RFID label would solve these problems. However, using a RFID enabled vial lid presents several additional problems. First, the relatively small size of a vial lid would necessitate using a very small dipole antenna which would be extremely inefficient. Also, the circular shape of the lid would normally lead to using a coil type antenna. The difficulty in this approach is that because the antenna is placed on top of the lid, anyone reading the energy from the top of the lid would receive a null in the signal. Additionally, when a RFID tag is in proximity to or attached to a metallic or conductive surface, such as a metal container, the RFID typically cannot be read with specificity. The proximity of the metal to the antenna creates signal interference that prevents proper reading or writing of data to the RFID label. Glass vials usually have a metal cap crimped onto the glass that holds the plug or septum in place. The metal cap has a hole in the center so that the contents of the vial are accessible via a needle. Then a plastic cap is attached to the metal cap typically with a metal rivet. The metal rivet is positioned very close to the plastic cap which could also interfere with a dipole antenna.

Thus, there exists a need for an easy way to track products, such as medications, contained in small containers, such as vials, without covering existing content labels on the vials. The present invention discloses a RFID enabled label for use on a vial lid and a method for using an RFID label attached to the top of a vial.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a RFID label for use with a container having a lid. The RFID label comprises a substrate component, a RFID antenna, and a RFID chip. The RFID antenna is formed into or attached to an inside surface of the substrate component. The RFID chip is electrically coupled to the RFID antenna.

In accordance with one embodiment, the container is a medication vial. The RFID antenna is a slotted loop antenna comprising a conductor sheet and a slot comprising an open end and a closed end formed into the conductor sheet. The RFID chip is encoded with information related to the contents of the vial, such as medication dosage, concentration, and content expiration date, etc. The RFID antenna is positioned such that it is not immediately adjacent to any metal component of the vial, thereby generating an acceptable read range for an RFID reader.

In accordance with another embodiment, a RFID label is provided that is attachable proximate to a metal object on a container. The RFID label comprises a substrate component, a RFID antenna, a RFID chip, and a spacer element positioned between the RFID antenna and the metal object. The spacer element is used to increase the distance between the RFID antenna and any metal object on the container that would create interference and/or decrease read range.

In accordance with another embodiment, a method is provided for using RFID to track vials with a lid. The method comprises providing a RFID label comprising a substrate component, a slotted-loop antenna, and a RFID chip. The method further comprises securing the RFID label to a surface of a substrate, such as a lid. In one embodiment, the RFID label is secured to the external surface of a lid of a container, but the present invention also contemplates that the label may be applied to any surface of a substrate (i.e. internal surface of a lid, the side of a substrate, if applicable) external surface of the lid. The RFID label is positioned on the lid so as to generate an acceptable read range with a RFID reader at a distance of greater than one inch.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
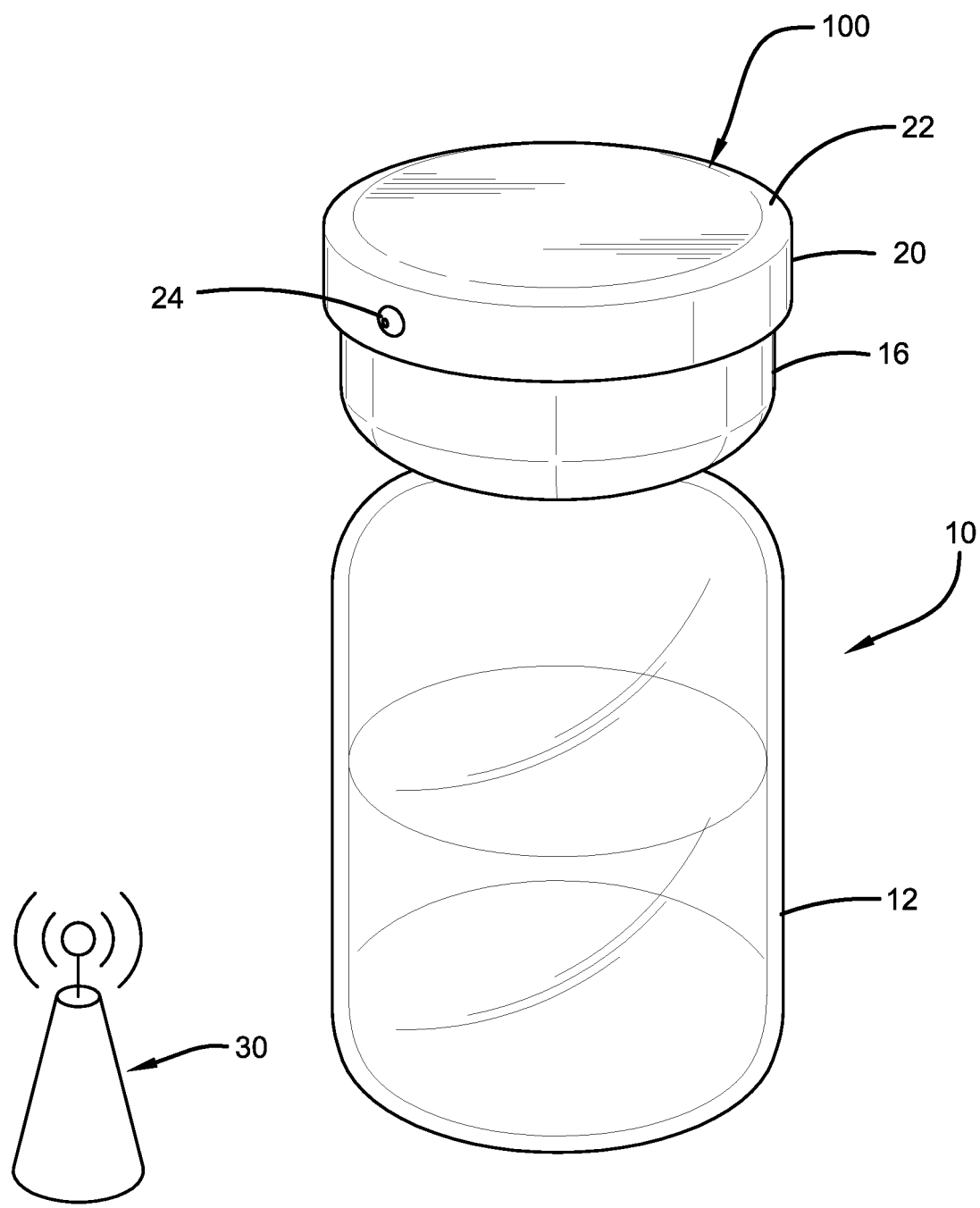
FIG. 1 illustrates a perspective view of a RFID label and a container in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a RFID label or tag attachable to a lid of a container. The invention is particularly useful for vials used in the medical and pharmaceutical industries and for other small containers, but is not limited to any particular purpose. Containers, such as used in the medical or pharmaceutical industry, typically have caps or lids with compact sizes and circular configurations that are not well suited to traditional RFID tagging techniques for a variety of reasons. The present invention, in one embodiment, uses a slotted antenna that can be conformed efficiently for these configurations and compact sizes. By orienting the RFID tag on a top, outer surface, or any side of the vial lid, the antenna of the RFID tag provides a field, such as a top side field, that increases the read range of the RFID label. Additionally, the path of the antenna, such as a slotted antenna, and location of the RFID chip may be chosen to avoid any metal components on the vial, mitigating signal interference caused by proximity of the antenna or chip to the metal. In one embodiment the RFID label or tag may be attachable to the inside of a lid container i.e. the side of the container not exposed to the outer environment. Thereby protecting the RFID label or tag from a potentially harmful environment.

Referring initially to the drawings, FIGS. 1-4 illustrate a RFID label for use with a container having a lid, and a method of using the same in accordance with the present invention. The present invention, as illustrated, contemplates the utilization of a singular RFID label, but it not limited to such, and a plurality of RFID labels may be utilized. As illustrated in FIG. 1, a RFID label 100 for use with a container 10 having at least one lid 20 is disclosed. The RFID label 100 is attachable or adherable to a surface such as an external surface 22 of the lid 20. In one embodiment a releasable or permanent or semi-permanent adhesive is utilized to attached the RFID label 100 to a surface of the lid 20. As such, the RFID label 100 will not cover or obscure any container markings, content labels, or the container contents themselves. The RFID label 100 is configured to be wirelessly interrogated by a RFID reader 30 or other such transceiver device, and to respond to such interrogation with a responsive radio signal. In one embodiment, the RFID label 100 may be detachable from an outside or external surface 22 of the lid 20. The RFID label 100 may further be reattached to an outside or external surface 22 of the lid 20 or another external layer container. This would be beneficial in the event the original surface 22 of the lid 20 becomes damaged but retention of RFID label 100 is desired.

The container 10 may comprise a vial that is generally tubular or bottle-like with a neck in configuration. However, the container 10 may be any vessel that uses a lid or cap having a relatively small size, such as, but not limited to medical vials, phials, ampules, jars, specimen bottles, or any other container utilizing a small cap or lid. These containers may also be used to contain biological samples, liquids, powders, chemicals, drugs, and the like. Vials are often used in healthcare applications to hold medications where tracking information such as, but not limited to dosage, concentration, expiration date, and lot number are particularly important.

In one embodiment, the container 10 is a vial comprising a body 12, a septum (not shown), a septum holder 16, and a lid 20. The body 12 is typically constructed from glass or plastic, and is open at the top. The septum is a cork, rubber, or plastic stopper used to plug the top of the body 12, and is held in place by the septum holder 16. The septum holder 16 is often a metal cap with a center hole that is crimped in place around the body 12. To access the contents of the vial, a needle is used to penetrate the septum material through the center hole. The lid 20 is typically a plastic or nonmetallic cap or cover that is placed over the septum and septum holder 16 to protect the exposed septum. The lid 20 may snap over the septum holder 16 and may be held in place with a connection component 24. The connection component 24 may be a metal rivet or any other kind of fastening component that could hold the lid 20 in place.

Figure 2:
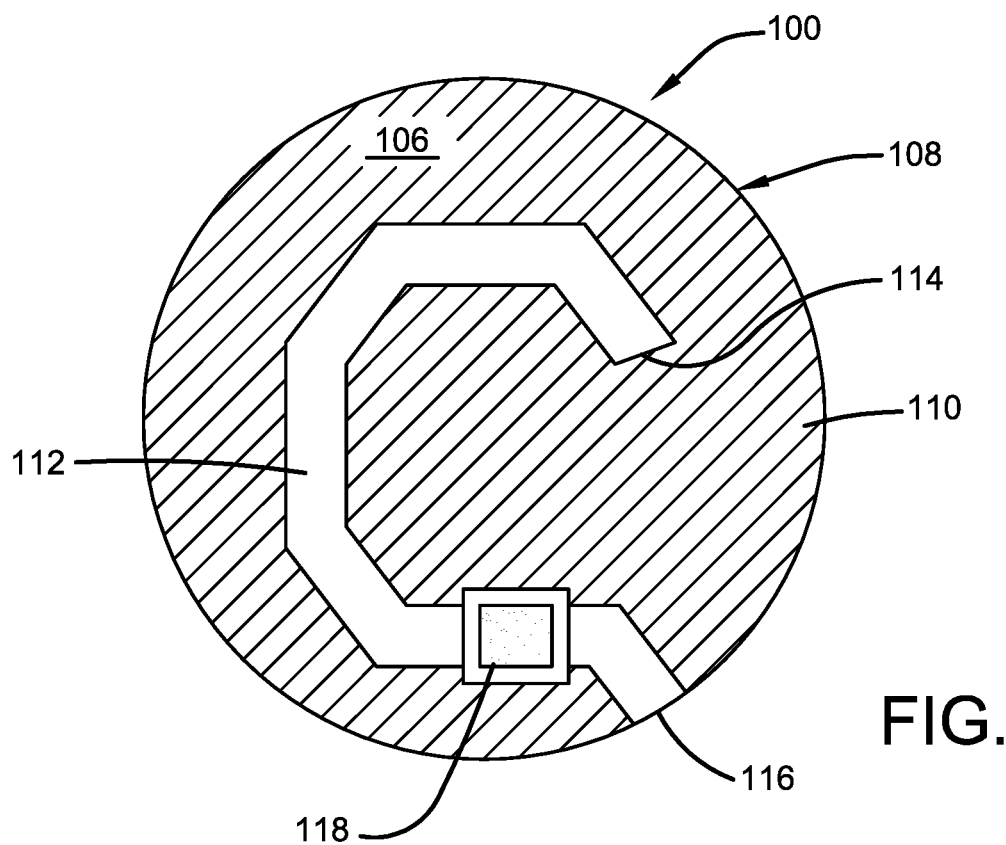
FIG. 2 illustrates an overhead view of a first side of the RFID label in accordance with the disclosed architecture.
Figure 3:
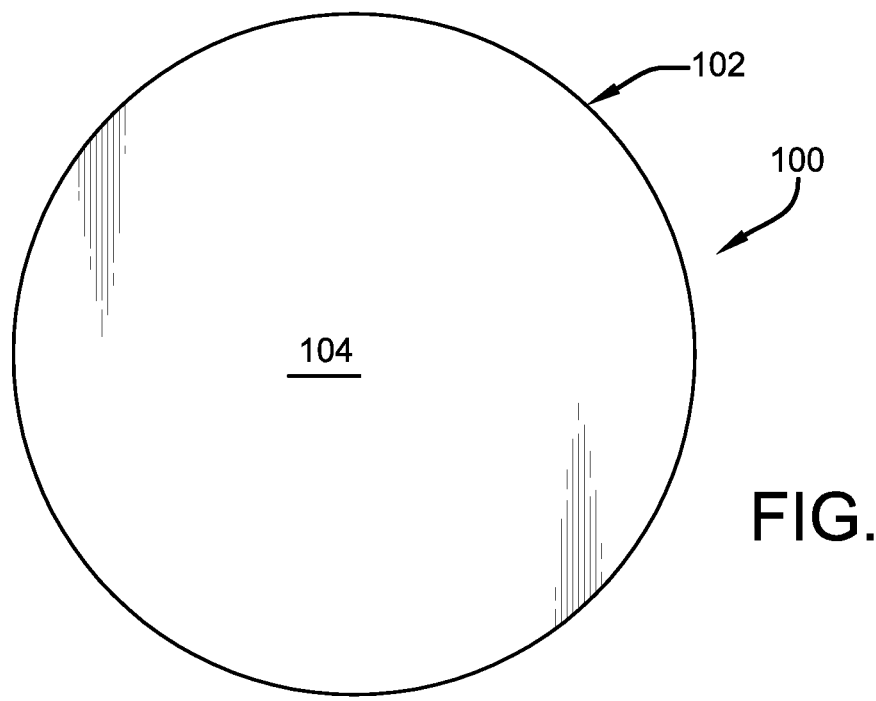
FIG. 3 illustrates an overhead view of a second side of the RFID label in accordance with the disclosed architecture.

As illustrated in FIGS. 2 and 3, the RFID label 100 comprises a substrate component 102, a RFID antenna 108, and a RFID chip 118. In one embodiment, a strap may be used to connect the RFID chip 118 to the RFID antenna 108. The substrate component 102 can operate as a structural component that provides strength and structure to the RFID label 100. The substrate component 102 comprises an external surface 104 and an inside surface 106, and may be manufactured from a non-conductive material such as polyethylene terephthalate, polyvinyl chloride, polystyrene, polyethylene, nylons, or any other suitable material.

The RFID antenna 108 is formed on or attached to the substrate component 102 on the surface 106 which in this particular embodiment can be considered an interior or inside surface. The RFID antenna 108 comprises a conductor sheet 110 and a slot 112. The slot 112 is formed, cut via mechanical, rotary, or laser, or etched into the conductor sheet 110. The conductor sheet 110 is generally shaped geometrically similarly to the lid 20 of the container 10. The conductor sheet 110 is typically manufactured from a thin electrically conductive material such as, but not limited to an aluminum or copper foil. The slot 112 comprises a closed end 114 and an open end 116 and is fully contained within the conductor sheet 110, except that the open end 116 is neither closed by nor short circuited with respect to the conductor sheet 110.

The RFID antenna 108 may be a slotted-loop or hybrid loop-slot type antenna generally referred to as a "sloop antenna." This type of antenna is advantageous as it is significantly more efficient than a dipole antenna in an equally compact size. The sloop antenna also alleviates the problem of a null signal that would be generated by a coil type antenna, as the slotted-loop antenna generates a top-side field. Additionally, a single loop antenna would typically be limited to a read range of less than one inch. The sloop antenna design is advantageous in a near field environment as the RFID antenna 108 can generate an acceptable read range for the RFID reader 30 of one inch or more when the RFID label 100 is placed on the exterior or top of the lid 20. An additional benefit to placing the RFID label 100 on the top side of the lid 20 is that the lid 20 acts as an insulator to limit any interference that would be caused by a metal septum holder 16.

The RFID chip 118 is a wireless communication device and is coupled to the RFID antenna 108. The RFID chip 118 is in electrical communication with the conductor sheet 110. The RFID chip 118 functions as a digital memory that may be encoded with information related to the container 10 and its contents, such as container product information. Furthermore, the chip 118 may be associated with an external database operated by a user on a computer, laptop, mobile device or the like. Where the database may hold information for encoding the RFID chip.

If the lid 20 is held in place with a metal rivet style connection component 24, the RFID antenna 108 may be designed with a slot path that avoids proximity to the rivet. This slot path design situates the RFID chip 118 and its strap area away from and not directly above the rivet which mitigates interference from the metal. Therefore, the sloop antenna design permits the RFID antenna 108 to be located non-adjacent to any metal component that the container 10 may have, thereby reducing the likelihood of interference.

Figure 4:
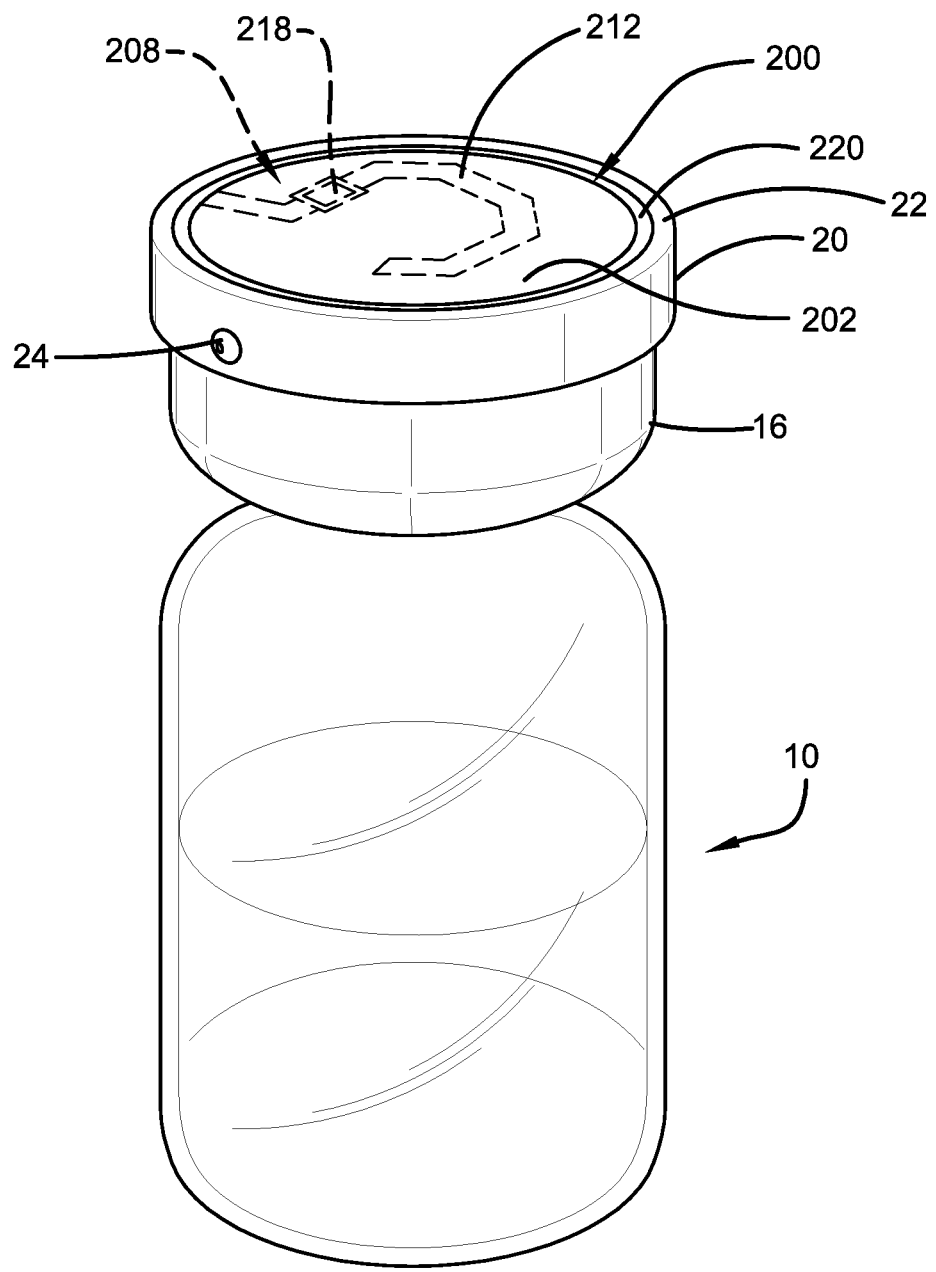
FIG. 4 illustrates a perspective view of a RFID label in accordance with the disclosed architecture.

FIG. 4 illustrates an embodiment for an RFID label 200 usable with a container 10 having a metal component such as a metal cap 16 or a metal rivet 24 for holding a lid 20 of the container 10 in place. The RFID label 200 comprises a substrate component 202, a RFID antenna 208, a RFID chip 218, and a spacer element 220. As described in previous embodiments, the RFID antenna 208 is formed on or attached to the substrate component 202 and the RFID chip 218 is coupled to the RFID antenna 208. The RFID label 200 is adhered or glued to an external surface 22 of the lid 20 with the spacer element 220 positioned in between. The RFID antenna 208 may comprise a slotted-loop antenna 212 that can generate a top-side field with an acceptable read range of greater than one inch.

The spacer element 220 may be manufactured from a non-conductive material similar to the substrate component 202 and is positional between the RFID antenna 208 and the external surface 22 of the lid 20. As such, the spacer element 220 increases the distance between the RFID antenna 208 and any metal parts of the container 10 providing a non-conductive buffer to further decrease interference and increase the read range for vials or containers 10 with metal components. The spacer element 220 may also be a non-conductive material different than the substrate component 202. For example, the spacer element 220 may be a plastic, a recyclable material or a combination of recyclable materials. Furthermore, the spacer element 220 may be of a material comprising thermochromic materials. This would be beneficial in the event a user would like an external/visual indication of the environmental condition the RFID label 100 is in. The thermochromic material may be customly configured to activate at various temperatures.

A method of using RFID in conjunction with a container 10 is also disclosed. The container 10 may be a vial, such as those commonly used in the healthcare industry. The method comprises providing a RFID label 100 comprising a substrate component 102, a RFID antenna 108, and a RFID chip 118. The RFID label 100 is attachable to a lid 20 of the container 10. The RFID antenna 108 may be a slotted-loop antenna that is formed on, connected to, or attached to the substrate component 102. The RFID chip 118 is in electronic communication with the RFID antenna 108. The method continues by securing the RFID label 100 to an external surface 22 or outside of the lid 20 with glue, adhesive, chemical or mechanical bonding, or the like. The method continues by achieving an acceptable read range of the RFID label 100 by a RFID reader 30 of greater than one inch.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A RFID label for use with a container having a lid with a metallic component, the RFID label comprising:
    a substrate component that is substantially circular;
    a RFID antenna comprising a slotted-loop antenna arranged entirely on a first side of the substrate component and attached or adhered to the first side of the substrate component;
    a RFID chip on the first side of the substrate component and coupled to the RFID antenna;
    and a spacer element arranged facing the first side of the substrate component;
    wherein when the RFID label is attached to an external surface of the lid, the spacer element arranged between the lid and the substrate provides a separation between the RFID antenna and the lid.

2. The RFID label of claim 1, wherein the RFID antenna comprises a conductor sheet and a slot formed into the conductor sheet.

3. The RFID label of claim 2, wherein the slot comprises a closed end and an open end.

4. The RFID label of claim 1, wherein the RFID antenna generates a top-side field.

5. The RFID label of claim 1, wherein the container is a vial.

6. The RFID label of claim 1, wherein the container is used to store medication, biological samples, liquids, or powders.

7. The RFID label of claim 1, wherein the RFID chip is in electrical communication with the conductor sheet.

8. The RFID label of claim 1, wherein the RFID chip functions as a digital memory.

9. The RFID label of claim 1, wherein the RFID chip is encoded with information relating to a content of the container.

10. The RFID label of claim 1, wherein the RFID antenna is located spaced apart from any metal component of the container.

11. The RFID label of claim 1, wherein the RFID antenna generates a read range of greater than one inch.

12. The RFID label of claim 1, wherein the spacer element increases distance between the RFID antenna and the metallic component of the lid and decreases interference of the RFID antenna with the metallic component.

13. A RFID label for use with a container having a metal component, the RFID label comprising:
    a substrate component that is substantially circular;
    a RFID slotted loop antenna formed entirely on a first side of the substrate component;

a RFID chip on the first side of the substrate component and coupled to the RFID antenna;

and a spacer element arranged facing the first side of the substrate component;

wherein when the RFID label is attached to an external surface of the container, the spacer element arranged between the metal component and the substrate provides a separation between the RFID antenna and the metal component of the container.

14. The RFID label of claim 13, wherein the RFID label is adhered to an external surface of a lid of the container.

15. The RFID label of claim 13, wherein the container is a vial.

16. The RFID label of claim 13, wherein the RFID antenna generates a top-side field.

17. The RFID label of claim 13, wherein the RFID antenna generates a read range of greater than one inch.

18. A method of using a RFID in conjunction with a container having a lid, the method comprising:

providing a RFID label comprising a substrate component, a RFID antenna comprising a slotted-loop antenna arranged entirely on a first side of the substrate component and attached or adhered to the substrate component, and a RFID chip on the first side of the substrate component and coupled to the RFID antenna;

arranging a spacer element on the lid;

securing the RFID label on an external surface of the lid such that the spacer element is arranged between the lid and the substrate ; and positioning the RFID label on the lid in a manner so as to generate a top side field for achieving a read range of greater than one inch with a RFID reader.

\* \* \* \* \*